United States Patent [19]
Okimoto et al.

[11] Patent Number: 4,998,832
[45] Date of Patent: Mar. 12, 1991

[54] DOCUMENTATION SYSTEM HAVING PAGE FORMAT FUNCTION

[75] Inventors: Satoshi Okimoto, Komaki; Yukiharu Fujikawa, Nagoya; Naoki Otsuka, Konan; Miyuki Sato, Nagoya, all of Japan

[73] Assignee: Brother Kogyo Kabushiki Kaisha, Japan

[21] Appl. No.: 328,484

[22] Filed: Mar. 24, 1989

[30] Foreign Application Priority Data

Mar. 29, 1988 [JP] Japan .................... 63-75573

[51] Int. Cl.⁵ .................... B41J 11/44; B41J 19/68
[52] U.S. Cl. .................... 400/76; 364/519; 400/279; 400/316
[58] Field of Search .............. 400/76, 279, 63-64, 400/316, 298, 303, 67, 348, 278; 364/519

[56] References Cited

U.S. PATENT DOCUMENTS

| | | | |
|---|---|---|---|
| 4,615,631 | 10/1986 | Ueda et al. | 400/279 |
| 4,681,175 | 8/1989 | Hori et al. | 400/76 |
| 4,751,674 | 6/1988 | Aoyagi et al. | 400/76 |
| 4,804,284 | 2/1989 | Hattori et al. | 400/279 |
| 4,831,583 | 5/1989 | Pascoe | 364/519 |
| 4,848,940 | 7/1989 | Mori | 400/64 |
| 4,850,726 | 7/1989 | Kimura et al. | 400/279 |
| 4,877,345 | 10/1989 | Hori | 400/279 |
| 4,915,520 | 4/1990 | Makita | 400/279 |
| 4,934,851 | 6/1990 | Sasaki | 400/279 |

Primary Examiner—Eugene H. Eickholt
Attorney, Agent, or Firm—Oliff & Berridge

[57] ABSTRACT

A documentation system having a page format function wherein a desired number of input area beginning positions can be designed in a given documentation area, comprising designating means for designating input area beginning position information; storing means for storing said input area beginning position information designated by said designating means; left margin controlling means for retrieving one of said input area beginning position information stored in said storing means and for controlling a left margin of said documentation area according to said retrieved information; and indent mode setting means for activating said left margin controlling means.

7 Claims, 11 Drawing Sheets

PAGE FORMAT MEMORY 70

| P0 X0 | P0 Y0 | P0 X1 | P0 Y1 | ... | PK X0 | PK Y0 | ... |

| ... | PK Xi | PK Yi | ... | P9 X5 | P9 Y5 | P9 X6 | P9 Y6 | ... |

K: PAGE FORMAT NUMBER, 0-9

PK Xi: X-COORDINATE OF i-TH PAGE FORMAT POSITION
   OF PAGE FORMAT NUMBER K

PK Yi: Y-COORDINATE OF i-TH PAGE FORMAT POSITION
   OF PAGE FORMAT NUMBER K

DOCUMENTATION SYSTEM HAVING PAGE FORMAT FUNCTION

BACKGROUND OF THE INVENTION

The present invention relates to a documentation system such as a typewriter and a word processor, and more particularly to a documentation system having a so-called page format function.

Figure 11:
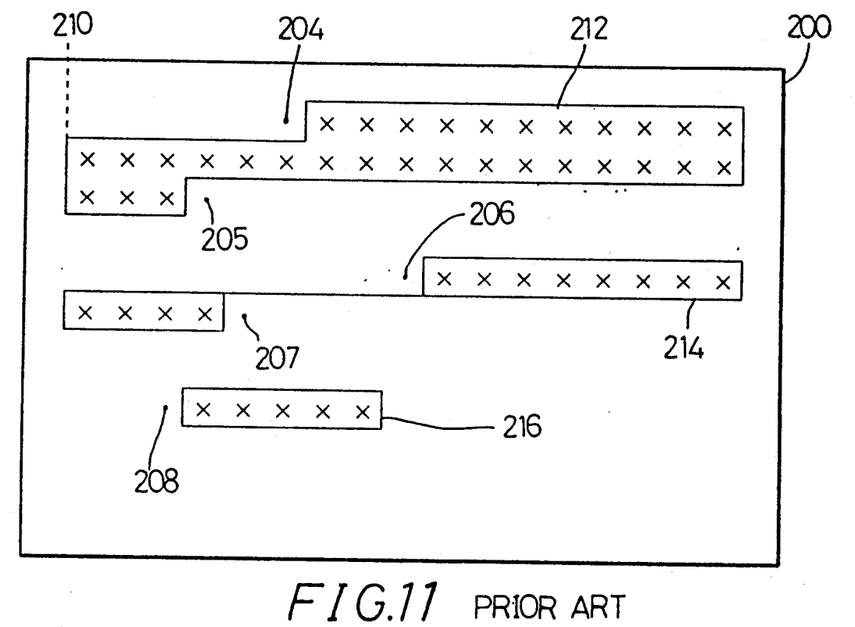
FIG. 11 is a schematic illustration of a print sample obtained by the conventional page format function.

Such a page format function will be simply described with reference to FIG. 11. Referring to FIG. 11, reference numeral 200 designates a given documentation area such as a print paper for use with a typewriter or a display screen for use with a word processor. In the documentation area 200, a plurality of input area beginning positions can be designated at 204, 206 and 208, for example. When the input area beginning positions have been designated, a character input position such as a cursor or carriage position can be automatically moved to any designated one of the above-mentioned input area beginning positions by operating a given key of a keyboard. For example, a carriage is moved to a designated input area beginning position in the typewriter, or a cursor is moved to a designated input area beginning position in the word processor. As shown in FIG. 11, characters or the like are inputted from the input area beginning position 204 to prepare a paragraph 212. When the carriage or cursor reaches a paragraph end 205, an operator may depress a given key to move the carriage or cursor to the next input area beginning position 206.

Figure 13:
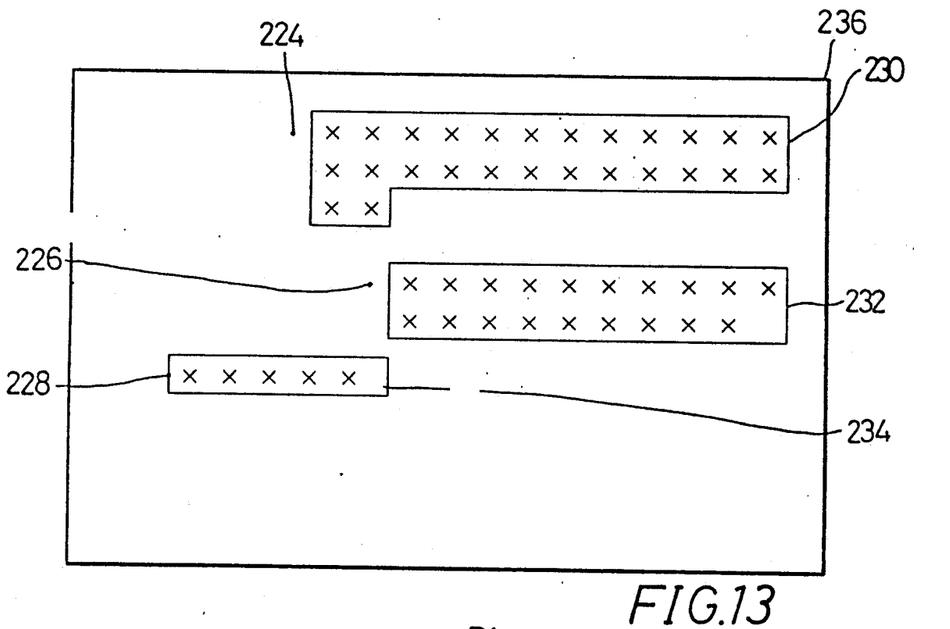
FIG. 13 is a schematic illustration of a print sample obtained by the page format function of the present invention.

However, in such a conventional page format function, as the input area beginning position is effective on only a first line where it is located, the carriage or cursor is returned to a left margin 210 after the second line in the paragraph 212. According to this function, preparation of a document having a layout as shown in FIG. 13 requires troublesome operation.

Figure 12:
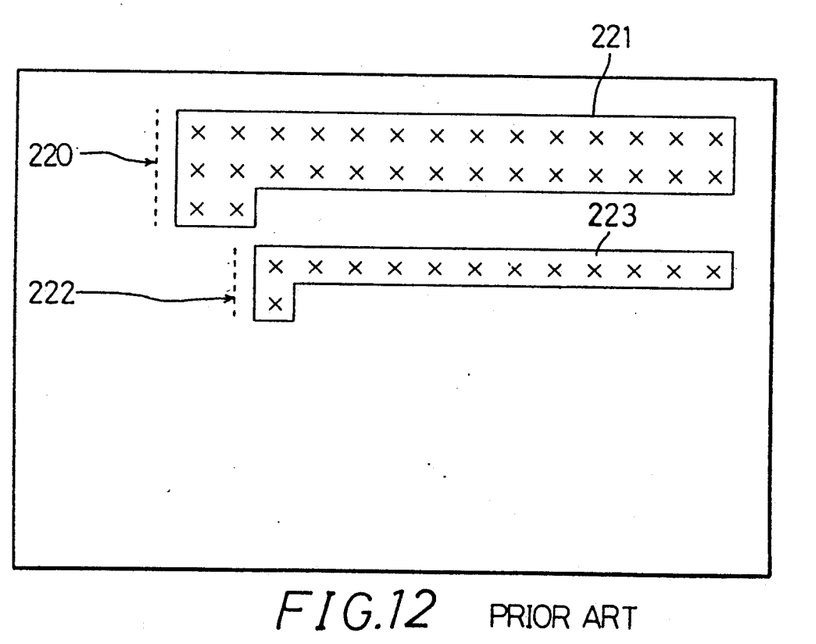
FIG. 12 is a schematic illustration of a print sample obtained by the conventional indent function.

FIG. 12 shows another type page format function in the prior art, wherein an indent position 220 for example is made effective on not only the first line but also the subsequent lines in a paragraph 221. That is, the indent position 220 serves as a temporary left margin effective in the paragraph 221. Such an indent function is disclosed in U.S. Pat. No. 4,265,554, for example.

However, in such a conventional page format function which can set the temporary left margin, it is necessary to set the temporary left margin per paragraph 221 or 223. That is, after preparation of the paragraph 221, a new temporary left margin 222 is required to be set again. Thus, key operation for setting the temporary left margin is rendered troublesome for an operator.

SUMMARY OF THE INVENTION

It is an object of the present invention to provide a documentation system having a page format function which may automatically set a temporary margin position from an input area beginning position so as to make easy documentation of columns or paragraphs.

According to the present invention, there is provided a documentation system having a page format function wherein a desired number of input area beginning positions can be designated in a given documentation area, comprising designating means for designating input area beginning position information; storing means for storing said input area beginning position information designated by said designating means; left margin controlling means for retrieving one of said input area beginning position information stored in said storing means and for controlling a left margin of said documentation area according to said retrieved information; and indent mode setting means for activating said left margin controlling means.

The invention will be more fully understood from the following detailed description and appended claims when taken with the drawings.

DETAILED DESCRIPTION OF THE PREFERRED EMBODIMENTS

There will now be described some preferred embodiments of the present invention with reference to FIGS. 1 to 10, 13 and 14 wherein the present invention is applied to an electronic typewriter.

Figure 1:
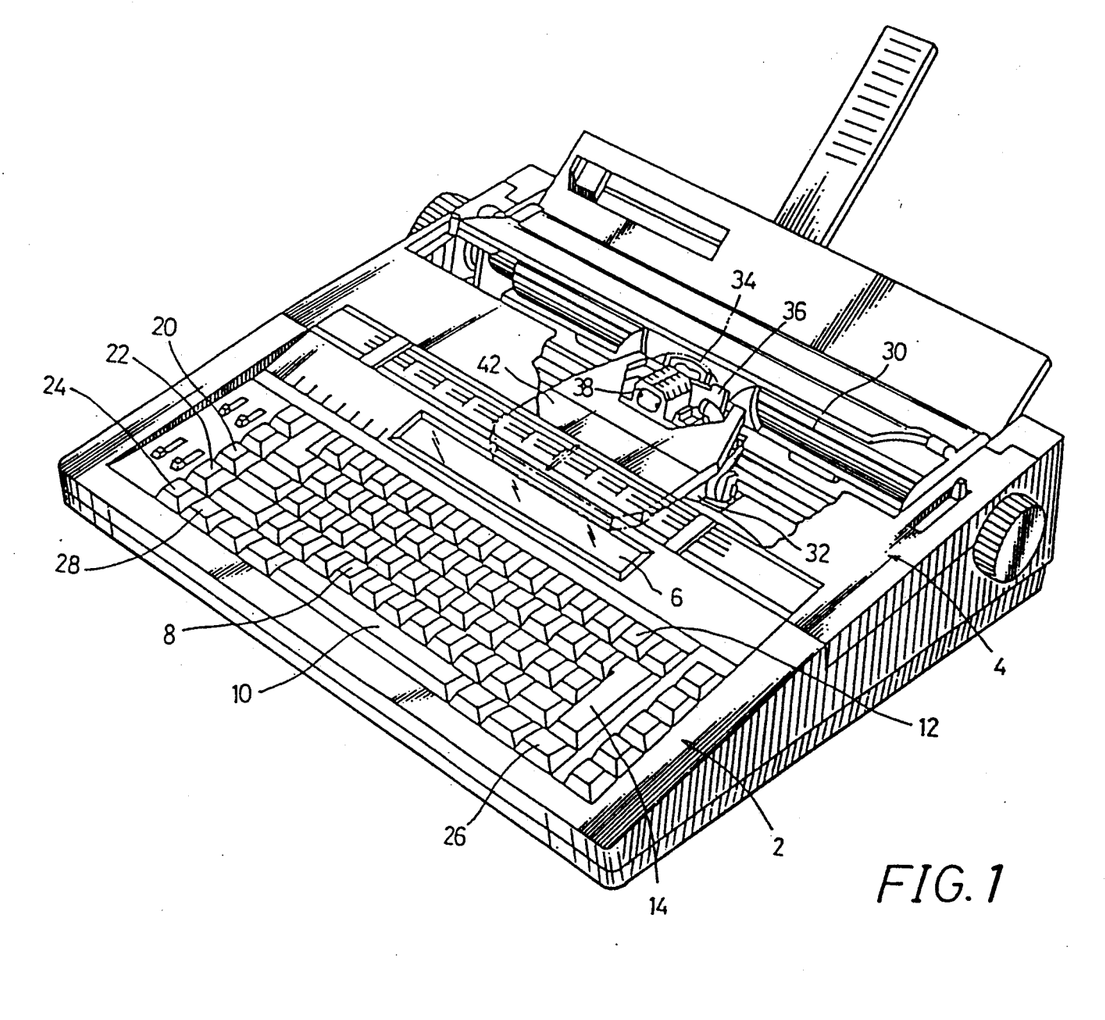
FIG. 1 is a perspective view of an electronic typewriter according to the present invention.

Referring to FIG. 1, the electronic typewriter is generally constructed of a keyboard 2, a printing mechanism 4 and a liquid crystal display 6 capable of displaying a predetermined number of lines of characters or the like inputted by the keyboard 2.

The keyboard 2 includes a plurality of character keys 8 such as letter keys, numeral keys and symbol keys, and also includes a plurality of function keys such as space key 10, back-space key 12, return key 14, page format set key 20, page format indent key 22, indent clear key 24, line feed key 26 and back line feed key 28. By using the space key 10, the back-space key 12, the return key 14, the line feed key 26 and the back line feed key 28, an operator can move a carriage position with respect to a print paper.

The printing mechanism 4 includes a platen 30 for retaining and feeding a paper and a carriage 32 movable along the platen 30. The carriage 32 carries a wheel cassette 36 containing a type-wheel 34, a solenoid 38 for driving a printing hammer, a ribbon cassette 42 containing a printing ribbon, etc. When any character key 8 is depressed; a type of the type-wheel 34 corresponding to the character key depressed is selected by rotation of the type-wheel 34, and the type is hammered by the printing hammer against the printing ribbon, thereby obtaining a printed character on the paper. Then, the carriage 32 is moved along the platen 30 by one pitch. When the carriage 32 reaches a right margin or when the return key 14 is depressed, the carriage 32 is returned to a left margin and the platen 30 is rotated by one line. This margin control is achieved by a margin controlling means as well known.

Although not shown in FIG. 1, independent motors are provided to drive the platen 30, the carriage 32 and the type-wheel 34, and the motors are controlled by a control circuit to be hereinafter described.

Figure 2:
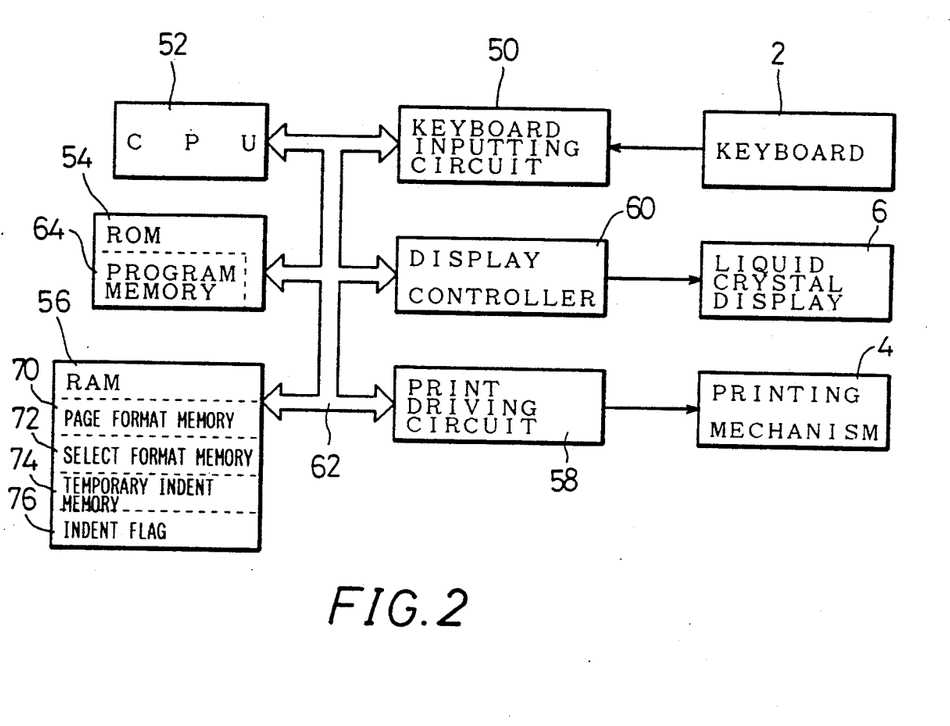
FIG. 2 is a block diagram of a control circuit for controlling the electronic typewriter.
Figure 3:
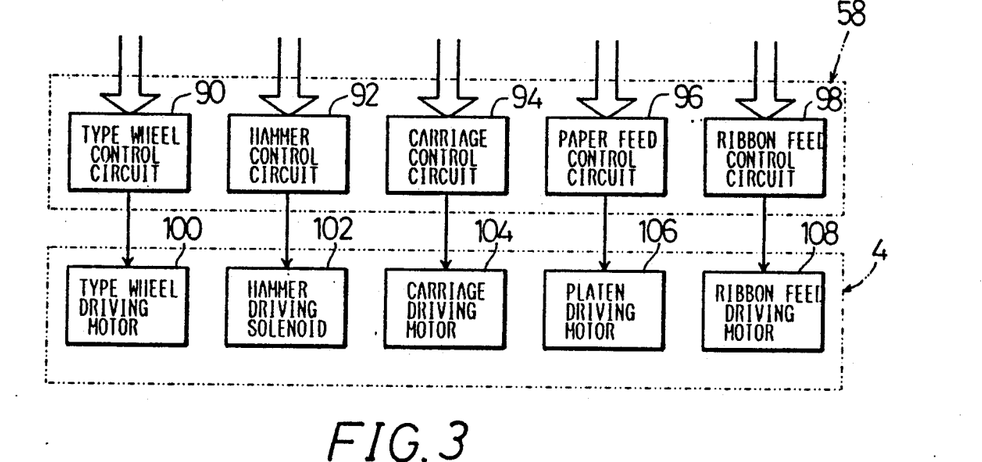
FIG. 3 is a block diagram of the print drive control circuit and the print mechanism shown in FIG. 2.

Referring next to FIG. 2 which shows a block diagram of a control circuit for controlling the electronic typewriter.

The keyboard 2 is connected through a keyboard inputting circuit 50 and a common bus 62 to a CPU 52, so that a key code corresponding to any depressed key of the keyboard 2 may be inputted to the CPU 52. The CPU 52 is also connected through the common bus 62 to ROM 54, RAM 56, print driving circuit 58 and display controller 60.

The ROM 54 includes a program memory 64 storing various control programs for controlling the electronic typewriter. The above-mentioned margin control is executed by one of the programs stored in the memory 64.

The RAM 56 includes a page format memory 70 for storing page format position information with respect to an absolute origin (input area beginning position information), a select format memory 72 for storing a page format number k, a temporary indent memory 74 for storing an indent position in an indent mode, and an indent flag 76 for setting a flag indicative of the indent mode. The RAM 56 also includes a buffer, register, counter, etc. The number of the column position of the carriage 32 and the number of the line fed by the platen 30 are counted by one of the counters in the RAM 56.

The print driving circuit 58 receives from the CPU 52 a carriage moving signal and a type selecting code corresponding to a character to be printed, and controls the driving motors for driving the carriage 32 and the type wheel 34 according to the carriage moving signal and the type selecting code. More specifically, referring to FIG. 3, the print driving circuit 58 comprises a type-wheel control circuit 90 for controlling a type-wheel driving motor 100, hammer control circuit 92 for controlling a hammer driving solenoid 38, carriage control circuit 94 for controlling a carriage driving motor 104, paper feed control circuit 96 for controlling a platen driving motor 106, and ribbon feed control circuit 98 for controlling a ribbon feed driving motor 108.

The display controller 60 is connected to a liquid crystal display 6 to display characters on the liquid crystal display 6, and includes a character generator storing many character dot patterns corresponding to character codes.

Figure 4:
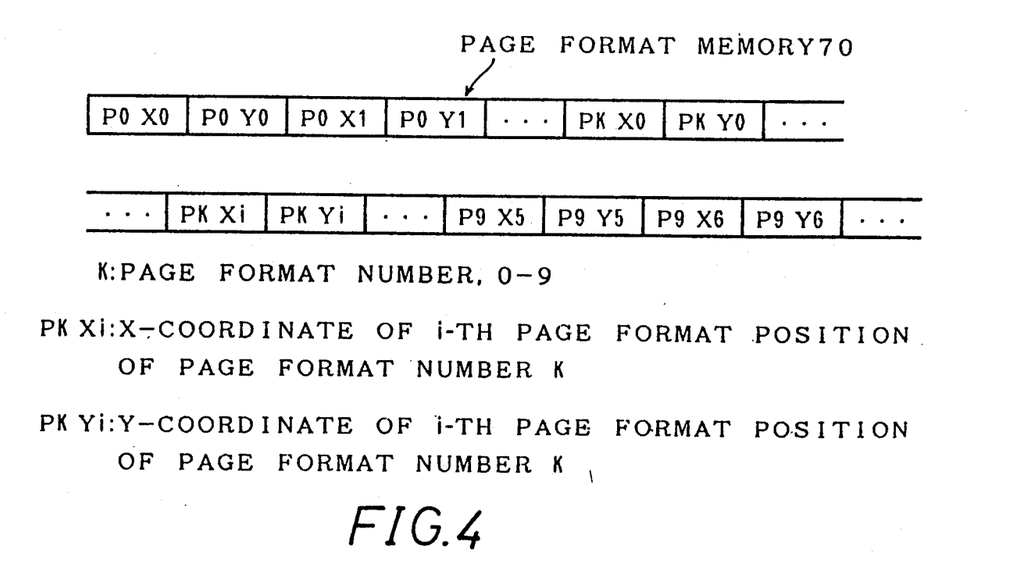
FIG. 4 is a schematic illustration of the page format memory shown in FIG. 2.

A plurality of the page format positions (input area beginning positions) can be designated per page, and the page format number k (0-9) is given in correspondence with a page number. A total number of the page format positions storable in the page format memory 70 is set to 100, for example. Accordingly, if ten page format numbers k are stored, ten page format positions can be designated per page format number in average. FIG. 4 shows a schematic illustration of a content in the page format memory 70, wherein PkXi and PkYi denote an X-coordinate and a Y-coordinate of an i-th page format position (input area beginning position) of the page format number k with respect to an absolute origin, respectively.

Figure 5A:
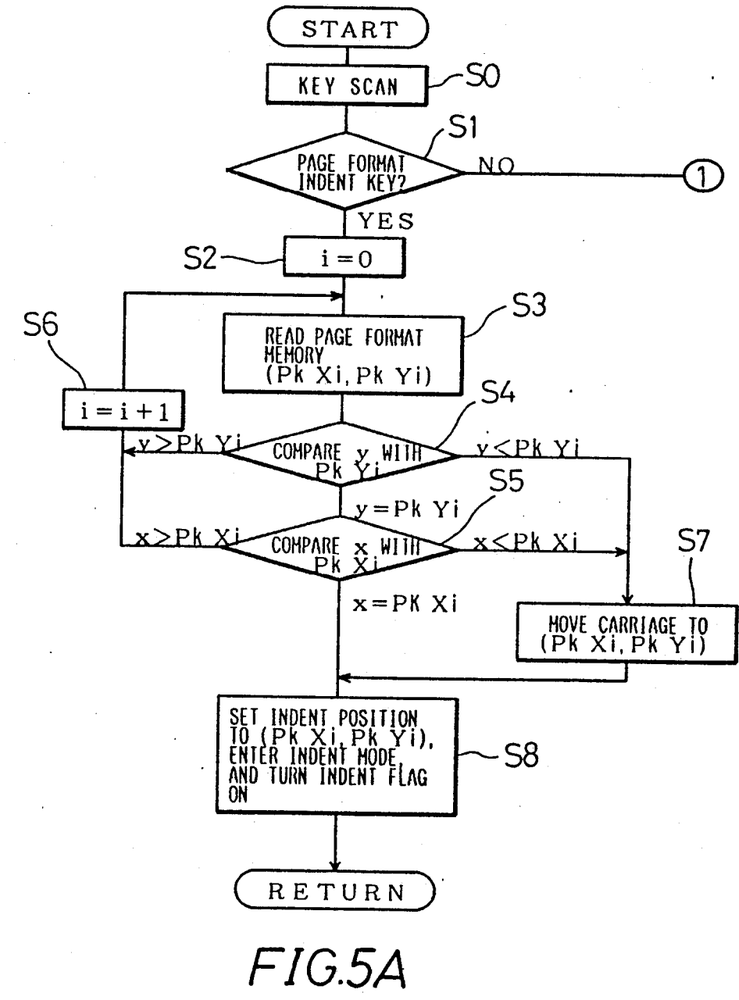
FIG. 5A is a flowchart of the program for retrieving an input area beginning position information stored in the page format memory.
Figure 5B:
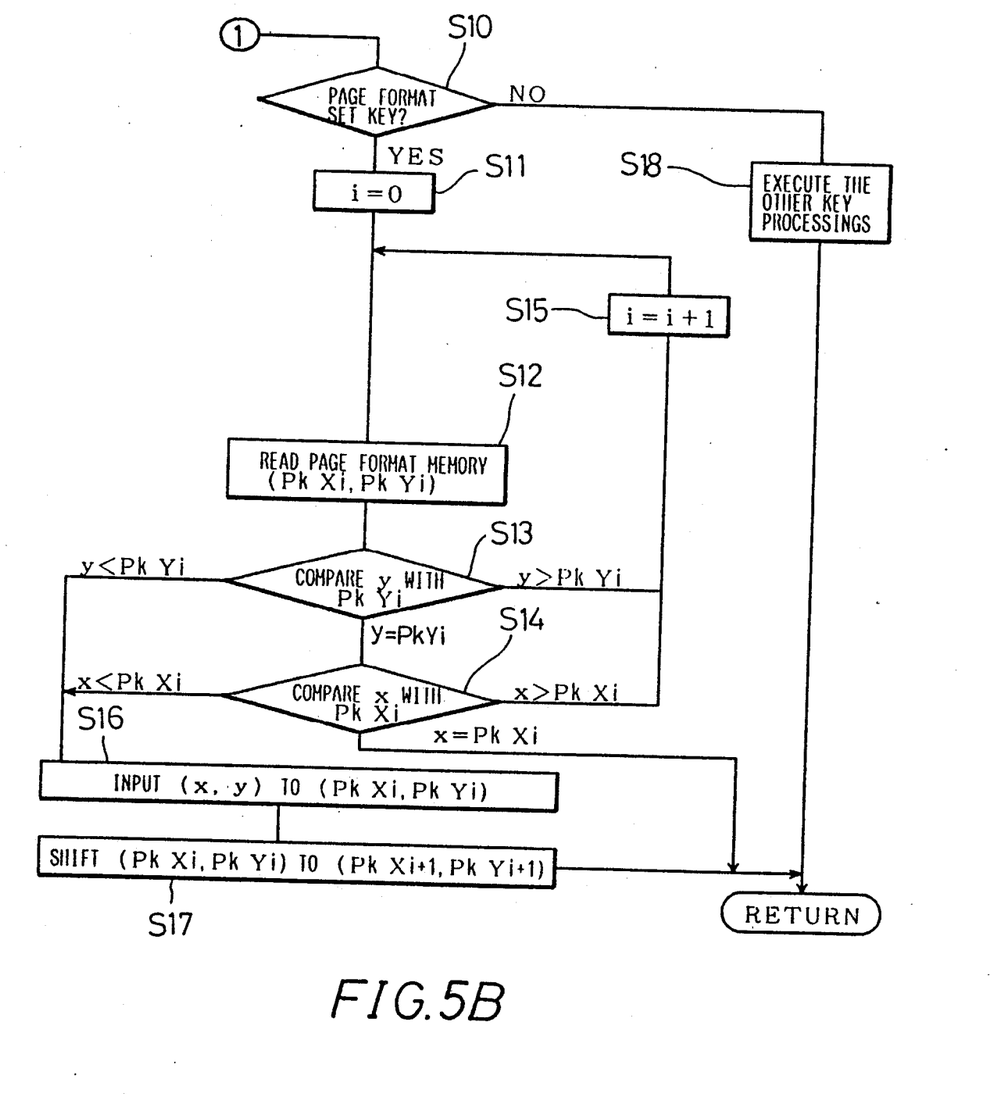
FIG. 5B is a flowchart of the program for storing a new input area beginning position information into the page format memory.

FIG. 5A shows a flowchart of the program for retrieving the page format position (input area beginning position information) stored in the page format memory 70, and FIG. 5B shows a flowchart of the program for storing a new page format position (input area beginning position information) in the page format memory 70.

Figure 7A:
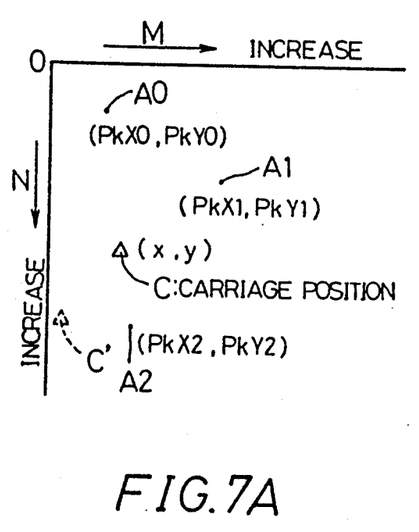
FIGS. 7A to 7D are illustrations of the positional relation between the input area beginning positions and the carriage position in the documentation area.

There will first be described the processing of setting a new page format position with reference to FIG. 5B. Before setting any new page format position, the page format number k (0-9) is designated by an operator, and the carriage 32 is moved to a position to be designated as a page format position. Under the condition, the page format set key 20 is depressed by the operator. That is, it is determined in step S10 that the answer is YES. Then, the program proceeds to step S11 wherein i=0 is set. In step S12, the content in the page format memory 70 is read. That is, the previously stored page format position (PkXi, PkYi) is read. Then, the program proceeds to step S13 wherein the Y-coordinate (y) of the present carriage position as designated is compared with PkYi(i.e., PkY0) read in step S12. As shown in FIG. 7A, the magnitude of the X-coordinate increases in a direction of arrow M, and the magnitude of the Y-coordinate increases in a direction of arrow N.

If y is less than PkYi in step S13, that is, it is determined that the present carriage position as designated is located at a position above any one of the previously stored page format positions as viewed in FIG. 7A; the program proceeds to step S16.

If y=PkYi in step S13, that is, it is determined that the present carriage position as designated is located on the same line as of one of the previously stored page format positions as viewed in FIG. 7A, the program proceeds to step S14. In step S14, the X-coordinate (x) of the present carriage position is compared with PkXi (i.e., PkX0) read in step S12. If x is less than PkXi in step S14, that is, it is determined that the present carriage position as designated is located at a position left of one of the previously stored page format positions on the same line as viewed in FIG. 7A, the program proceeds to step S16. If x=PkXi in step S14, the program is ended.

In step S16, the values of x and y are inputted to PkXi and PkYi, respectively. Then, in step S17, PkXi and PkYi are shifted incrementarily to PkXi+1 and PkYi+1, respectively. For example, PkX0 is shifted to PkX1, and PkY0 is shifted to PkY1.

If y is greater than PkYi in step S13 or x is greater than PkXi in step S14, that is, it is determined that the present carriage position is located at a position below or right of one of the previously stored page format positions on the same line, the program proceeds to step S15 wherein the value of i is incremented by one, and the program is returned to step S12. If (PkXi, PkYi) is absent in the page format memory 70 in step S12, the program skips step S13 to proceed to step S16. According to this program, the input area beginning position information designated by the operator are stored in the page format memory 70 in the RAM 56 in the sequence with respect to line number in the documentation area 5 and with respect to column number when the line numbers are same.

The above flow is exemplarily illustrated in FIG. 7A. Referring to FIG. 7A, A0, A1 and A2 denote previously stored page format positions, and C denotes a present carriage position to be designated where the page format set key 20 is depressed. First, the Y-coordinate (PkY0) of the page format position A0 is compared with the Y-coordinate (y) of the present carriage position C. Since y is greater than PkY0, the value of i is incremented by one. Then, the Y-coordinate (PkY1) of A1 is compared with y. Since y is yet greater than PkY1, the value of i is further incremented by one. Then, the Y-coordinate (PkY2) of A2 is compared with y. Since y is less than PkY2, x and y are inputted to PkX2 and PkY2, respectively (See step S16). Then, the previous values of PkX2 and PkY2 are shifted to PkX3 and PkY3, respectively.

In the case that the carriage position is located at C′ (x′, y′) lying on the same line as of A2 and left side of A2, y′=PkY2 is valid, and x′ is less than PkX2. Then, x′ and y′ are inputted to PkX2 and PkY2, respectively (See step S16). Then, the previous values of PkX2 and PkY2 are shifted to PkX3 and PkY3, respectively. Thus, the page format positions are stored in the sequence of increase in Y-coordinates as shown in FIG. 7A and when the Y-coordinates are the same, they are stored in the sequence of increase in X-coordinates.

Referring next to FIG. 5A, if the page format indent key 22 is depressed in step S1, the program proceeds to step S2 wherein i=0 is set. Then, in step S3, (PkXi, PkYi) which is initially (PkX0, PkY0) is read from the page format memory 70. Then, in step S4, the Y-coordinate y of the present carriage position is compared with PkYi. If y is greater than PkYi, the program proceeds through step S6 to step S3. After such loop is repeated, and if y is less than PkYi, the program proceeds to step S7 where the carriage 32 is moved to the page format position (PkXi, PkYi).

If y=PkYi is valid in step S4, the program proceeds to step S5 wherein the X-coordinate x is compared with PkXi. If x is greater than PkXi, the steps S6, S3, S4 and S5 are repeated. Then, if x is less than PkXi is valid in step S5, the program proceeds to step S7. Then, in step S8, the retrieved page format position (PkXi, PkYi) is set in the temporary indent memory 74 in the RAM 56 and turn on an indent flag in the indent flag 76 in the RAM 56 to enter an indent mode.

If x=PkXi is valid in step S5, the step S7 is skipped to proceed to step S8. While the indent flag is on, the left margin position referred by the program for executing the margin control is set to the information stored in the temporary indent memory 74 in the RAM 56.

Figure 7B:
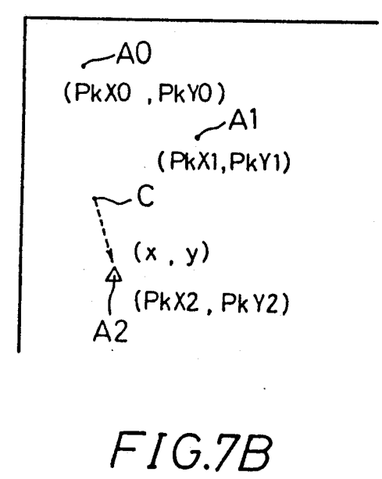

The above flow is exemplarily illustrated in FIG. 7B. Reference characters A0, A1 and A2 denote the same points as in FIG. 7A, and C denotes the position of the carriage 32 when the page format indent key 22 is depressed. Since y is not greater than PkY1 and y is less than PkY2, the carriage 32 is moved to (PkX2, PkY2). Thus, when the page format indent key 22 is depressed, the page format position just subsequent to the present carriage position is retrieved, and the carriage 32 is moved to the retrieved page format position.

Figure 6:
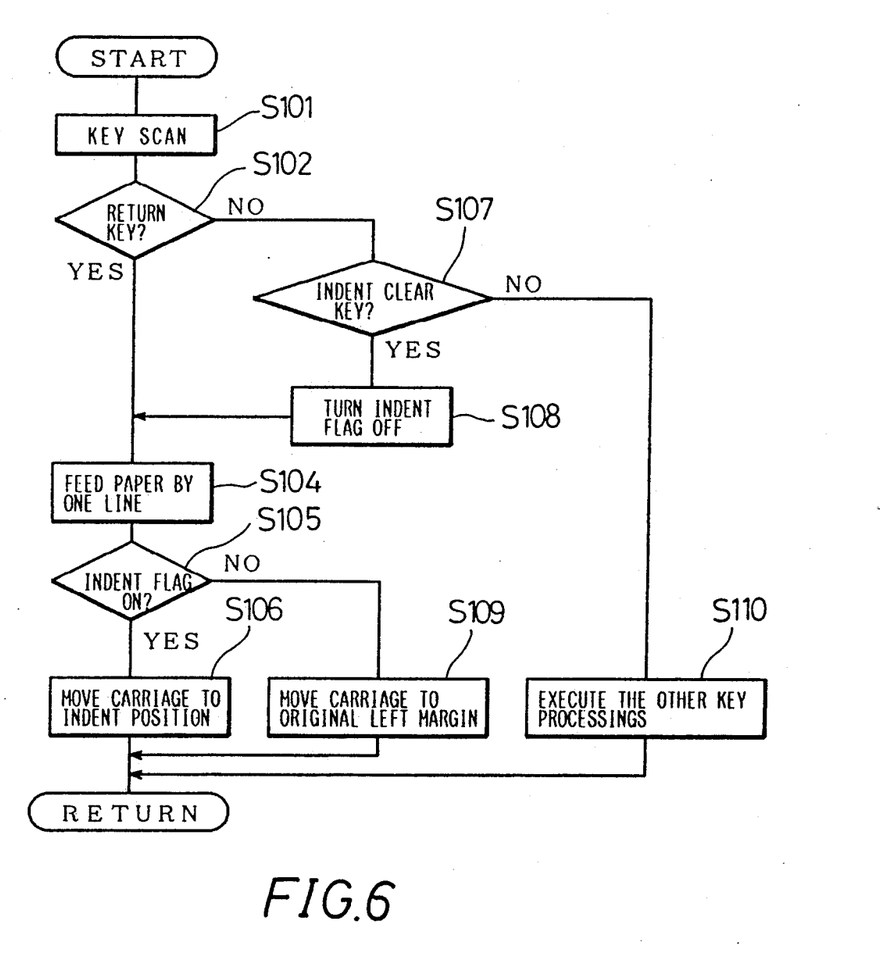
FIG. 6 is a flowchart of the program for executing the operation in the indent mode.
Figure 7C:
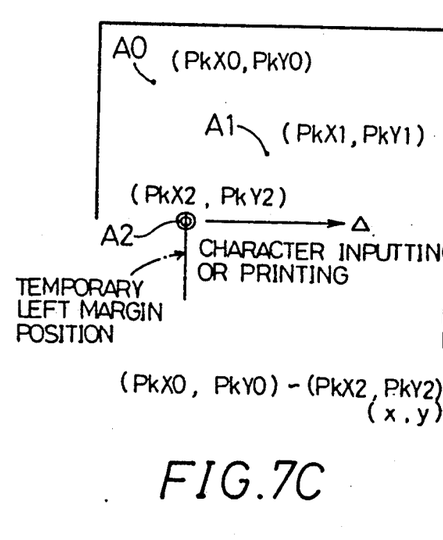
Figure 7D:
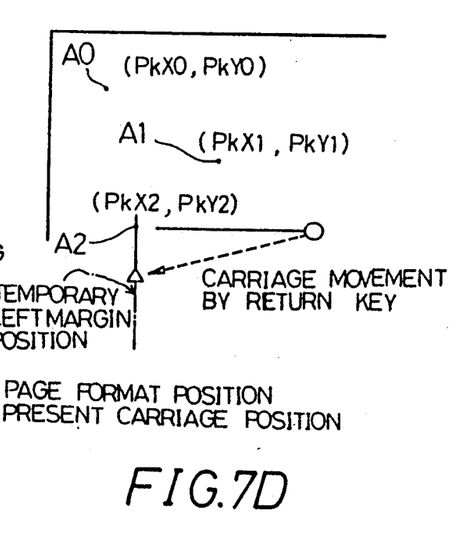
Figure 8:
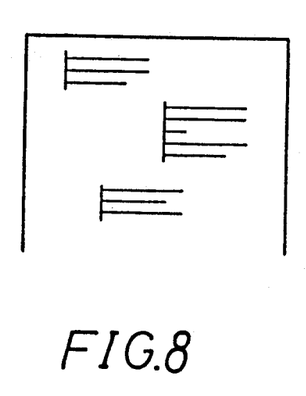
FIG. 8 is a schematic illustration of a print sample obtained by the indent mode.
Figure 9:
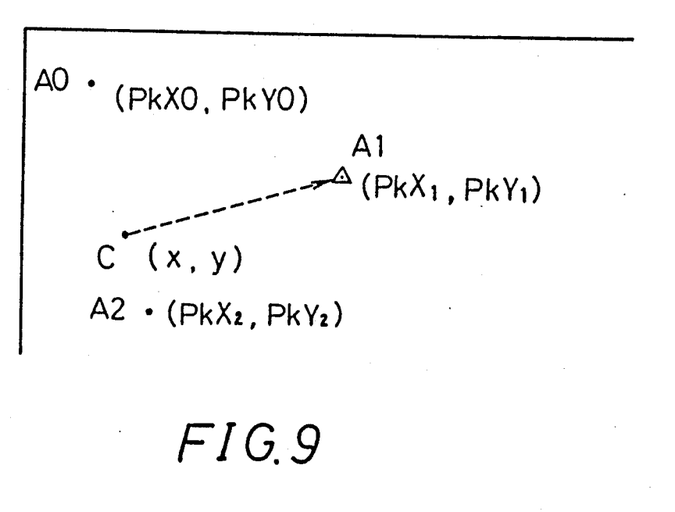
FIG. 9 is a view similar to FIGS. 7A to 7D, illustrating a second preferred embodiment of the present invention.

After entering the indent mode, the processing is executed as shown in FIG. 6. Referring to FIG. 6, when any key is inputted from the keyboard 2, the key scan is executed in step S101. If character keys are depressed, the program proceeds through steps S102 and S107 to step S110 wherein printing of the characters is executed from the indent position as shown in FIG. 7C. If the return key 14 is depressed in step S102, a print paper is fed by one line in step S104, and the program proceeds to step S105. As the indent flag is on in step 105, the carriage 32 is returned to the column which is designated by the information stored in the temporary indent memory 74 in the RAM 56. As mentioned above, the information stored in the temporary indent memory 74 is the same as the page format position (input area beginning position), the carriage 32 is returned to the position just below the page format position as shown in FIG. 7D. That is, the indent position serves as a temporary left margin in the indent mode. As a plurality of such temporary left margins can be set in correspondence with a plurality of page format positions, a plurality of paragraphs or columns having different indent positions can be easily formed as shown in FIGS. 8 and 13.

If the indent clear key 24 is depressed, the steps S101, S102, S107 and S108 in FIG. 6 are executed to turn the indent flag off. Then, as the steps S104, S105 and S109 are executed, the carriage 32 is returned to the original left margin in the given documentation area.

Figure 14:
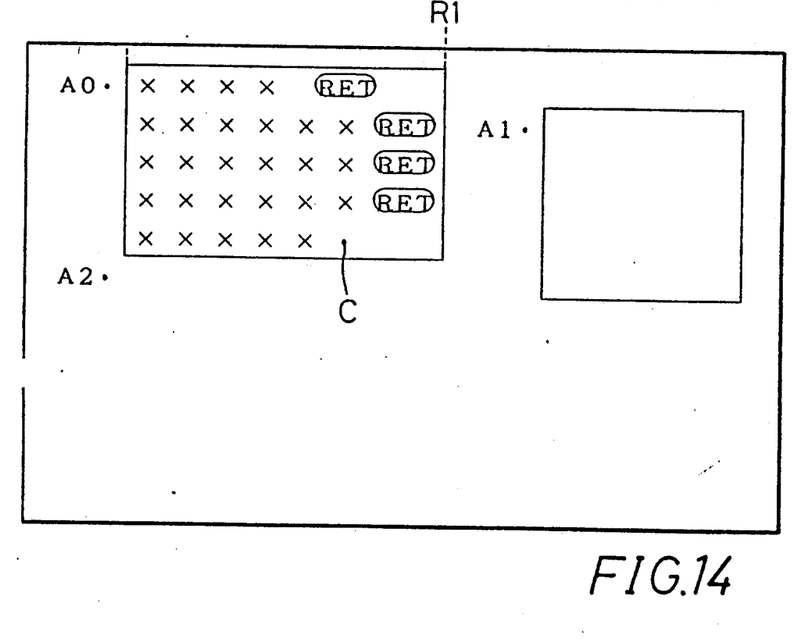
FIG. 14 is a view similar to FIG. 8 as obtained by the flowchart shown in FIG. 10.

In preparing the columns as shown in FIG. 14, when the page format indent key 22 is depressed at the present carriage position C, the carriage 32 is moved to the indent position A2 below the position C rather than the indent position A1 above the position C according to the above-mentioned preferred embodiment. In FIG. 14, although a symbol RET denotes that the return key 14 has been depressed to return the carriage 32 to a temporary left margin L1, the carriage 32 may be automatically returned to the left margin L1 when it reaches a right margin R1.

Figure 10:
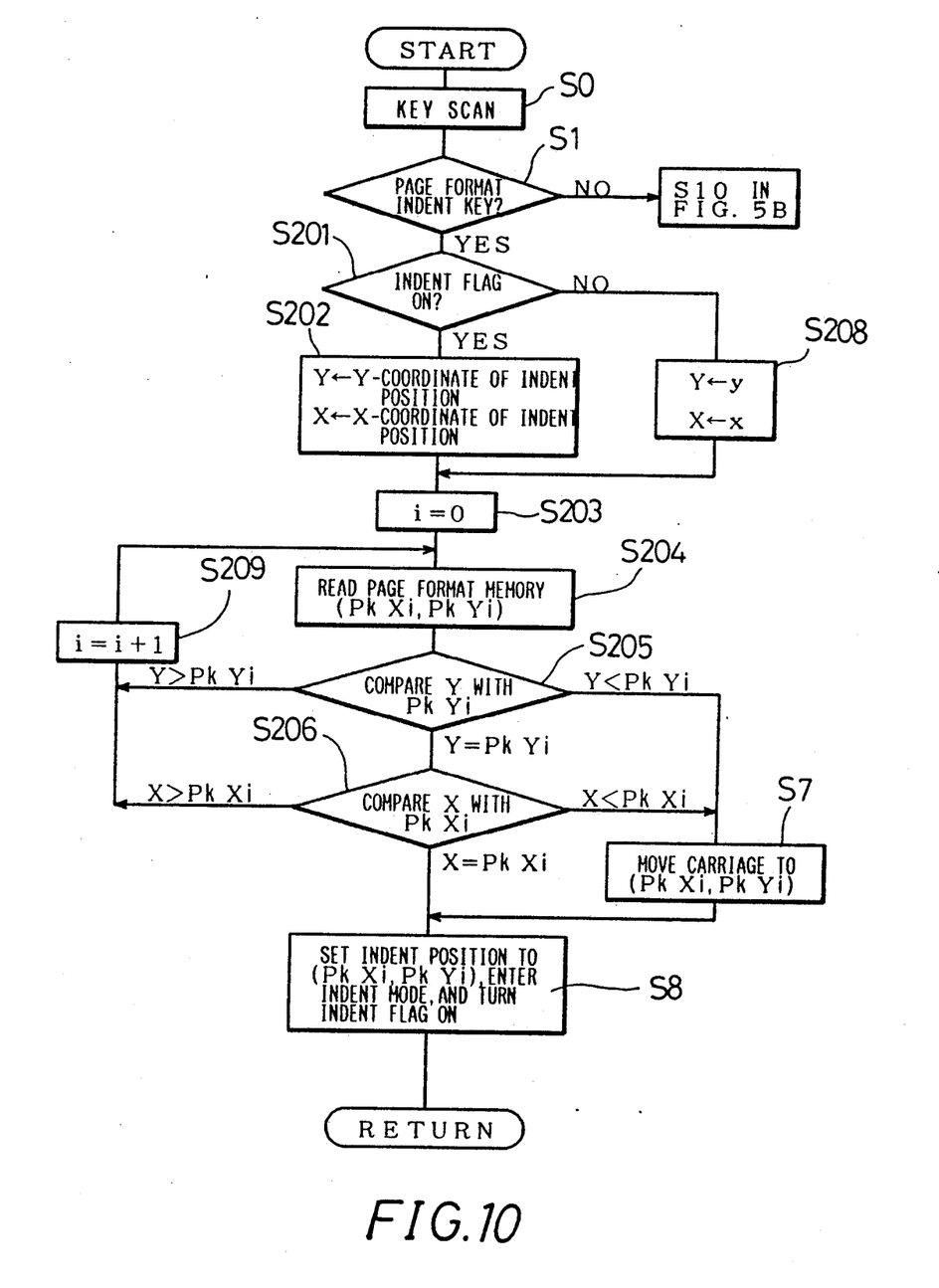
FIG. 10 is a flowchart of the program according to the second preferred embodiment.

If it is necessary to move the carriage 32 from the position C to the indent position A1 in FIG. 14, for example, the processing is executed in accordance with the flowchart as shown in FIG. 10.

Referring to FIG. 10, if it is determined in step S1 that the page format indent key 22 has been depressed, the program proceeds to step S201, while if the page format indent key 22 has not been depressed, the program proceeds to step S10 in FIG. 5B. In step S201, if the indent flag is on, that is, if the indent mode is valid, the program proceeds to step S202 wherein a Y-coordinate of the present indent position (e.g., the position A0 shown in FIG. 14) is inputted to a reference Y-coordinate Y, and an X-coordinate of the present indent position is inputted to a reference X-coordinate X. Then, the subsequent processings are executed int eh same manner as in FIG. 5A except that eh reference values X and Y are substituted for the reference values x and y. Conversely, when the carriage is located at the position C as shown in FIG. 14, the present indent position A0 is effective as the reference position. Under the condition, when the indent key 22 is depressed, the carriage 32 is moved to the next indent position A1 having a Y-coordinate greater than that of the present indent position A0.

On the other hand, if the indent flag is off in step S201, the program proceeds to step S208 wherein the Y-coordinate Y of the present carriage position is inputted to the reference Y-coordinate Y, and the X-coordinate x of the present carriage position is inputted to the reference X-coordinate X. Then, the subsequent processings are executed as in FIG. 5A. Conversely, when the carriage 32 is located at the position C as shown FIG. 14, the present carriage position C is effective as the reference position. Under the condition, when the indent key 22 is depressed, the carriage 32 is moved to the next indent position A2 having a Y-coordinate greater than that of the present carriage position C.

In the aforementioned preferred embodiments, the designating means according to the present invention is constituted of the carriage moving means for moving the carriage 32 with respect to the print paper, the page format set key 20, the memory area of the program memory 64 that stores the steps S10, S16, etc., and the CPU 52 for executing these steps. Further, the storing means is constituted of the page format memory 70, the memory area of the program memory 64 that stores the steps S10-S17, etc. The indent mode setting means is constituted of the page format indent key 22, the memory area of the program memory 64 that stores the steps S1-S8, etc., and the CPU 52 for executing these steps.

Although the above preferred embodiment is applied to the type-wheel typewriter, the present invention may be applied to any other documentation systems such as a word processor having a printing device such as a thermal printer and a wire dot printer, or not having such a printing device but including an input device and a display device wherein cursor movement may be controlled in the same manner as the carriage movement in the preferred embodiments.

Having thus described the preferred embodiments of the invention, it should be understood that numerous structural modifications and adaptations may be made without departing from the spirit of the invention.

What is claimed is:

1. A documentation system having a page format function wherein a desired number of input area beginning positions can be designated in a given documentation area, comprising:
   designating means for designating input area beginning position information;
   storing means for storing said input are beginning position information designated by said designating means;
   left margin controlling means for retrieving one of said input area beginning position information stored in said storing means and for controlling a left margin of said documentation area according to said retrieved information; and
   indent mode setting means for activating said left margin controlling means.

2. The documentation system as defined in claim 1, wherein said storing means stores said input area beginning position information designated by said designating means in sequence with respect to column position and line position.

3. The documentation system as defined in claim 1, wherein said indent mode setting means has a page format indent key, and when said page format indent key is depressed, and left margin controlling means is activated.

4. The documentation system as defined in claim 1 further comprising moving means for moving a cursor or a carriage whose position indicates a position where a character or the like inputted by a keyboard is displayed or printed to a position defined by the input area beginning position information retrieved from said storing means, wherein said moving means is activated by said indent mode setting means.

5. A documentation system having a page format function wherein a desired number of input area beginning positions can be designated in a given documentation area, comprising:
   designating means for designating input area beginning position information;
   storing means for storing said input area beginning position information designated by said designating means;
   temporary margin position storing means for storing a temporary margin position information;
   temporary margin controlling means for controlling a left margin of said documentation area according to said temporary margin position storing means; and
   indent mode setting means for activating said temporary margin position storing means and said temporary margin controlling means.

6. The documentation system as defined in claim 5 further comprising:
   input means for inputting characters or the like into said documentation system; and
   indicating means such as a cursor or a carriage for indicating a position where said character or the like inputted by said input means is displayed or printed, wherein said indicating means is controlled by said temporary margin controlling means.

7. The documentation system as defined in claim 6, wherein said input means has a key for moving said indicating means and a page format indent key; and wherein an input area beginning position information is designated by moving said indicating means to a desired position and depressing said page format indent key.

* * * * *